United States Patent
Okada et al.

(10) Patent No.: US 8,962,500 B2
(45) Date of Patent: Feb. 24, 2015

(54) MOLDED ARTICLE CONTAINING STACKED CARBON FIBER AND METHOD FOR PRODUCING SAME

(75) Inventors: Yasushi Okada, Iwaki (JP); Tatsuo Kobayashi, Iwaki (JP); Naohiro Sonobe, Iwaki (JP); Takashi Kameyama, Iwaki (JP)

(73) Assignee: Kureha Corporation (JP)

( * ) Notice: Subject to any disclaimer, the term of this patent is extended or adjusted under 35 U.S.C. 154(b) by 1677 days.

(21) Appl. No.: 12/438,499

(22) PCT Filed: Aug. 17, 2007

(86) PCT No.: PCT/JP2007/066401
§ 371 (c)(1),
(2), (4) Date: Sep. 9, 2010

(87) PCT Pub. No.: WO2008/023777
PCT Pub. Date: Feb. 28, 2008

(65) Prior Publication Data
US 2010/0330858 A1     Dec. 30, 2010

(30) Foreign Application Priority Data

Aug. 22, 2006  (JP) .................................. 2006-225833

(51) Int. Cl.
| | | |
|---|---|---|
| *D03D 15/00* | (2006.01) | |
| *D04H 13/00* | (2006.01) | |
| *B32B 5/28* | (2006.01) | |
| *B29C 70/16* | (2006.01) | |

(Continued)

(52) U.S. Cl.
CPC . *B32B 5/28* (2013.01); *B29C 70/16* (2013.01); *B29C 70/22* (2013.01); *D02G 3/16* (2013.01); *D03D 15/12* (2013.01); *B29K 2707/04* (2013.01); *B29K 2995/0017* (2013.01); *B29L 2031/726* (2013.01); *D10B 2101/12* (2013.01)
USPC ........................... 442/190; 442/189; 156/148

(58) Field of Classification Search
CPC ........................... B29C 70/22; B29L 2031/726
See application file for complete search history.

(56) References Cited

U.S. PATENT DOCUMENTS

| | | | | |
|---|---|---|---|---|
| 5,283,113 A | * | 2/1994 | Nishimura et al. | ........... 442/320 |
| 5,380,477 A | * | 1/1995 | Kent et al. | ..................... 264/103 |

(Continued)

FOREIGN PATENT DOCUMENTS

| | | | |
|---|---|---|---|
| EP | WO 2006/090643 | * | 8/2006 |
| JP | 61-138998 U | | 8/1986 |

(Continued)

OTHER PUBLICATIONS

International Search Report for International Application No. PCT/JP2007/066401 mailed Dec. 4, 2007 with English Translation.

*Primary Examiner* — D. Lawrence Tarazano
*Assistant Examiner* — Camie Thompson
(74) *Attorney, Agent, or Firm* — Cantor Colburn LLP (57) ABSTRACT

A molded article having both of sufficient strength and peel resistance, especially a heat insulating material for a high temperature furnace, is provided.
A carbon fiber-containing stacked molded article 1 comprises a substrate 10 composed of first carbon fibers piled, and a woven fabric layer 20 located on at least one surface of the substrate 10, and composed of carbon fiber spun yarns 21 including second carbon fibers 22 having an average fiber diameter of 12 μm or less, and third carbon fibers 23 having an average fiber diameter in excess of 12 μm.

17 Claims, 4 Drawing Sheets

(51) Int. Cl.
  *B29C 70/22* (2006.01)
  *D02G 3/16* (2006.01)
  *D03D 15/12* (2006.01)
  B29K 707/04 (2006.01)
  B29L 31/00 (2006.01)

(56) References Cited

U.S. PATENT DOCUMENTS

| 7,651,767 | B2 * | 1/2010 | Hirata et al. | 428/367 |
| 8,171,711 | B2 * | 5/2012 | Kobayashi et al. | 57/210 |
| 2008/0307765 | A1 * | 12/2008 | Kobayashi et al. | 57/252 |

FOREIGN PATENT DOCUMENTS

| JP | 63-97797 U | 6/1988 |
| JP | 2-208264 A | 8/1990 |
| JP | 3-248838 A | 11/1991 |
| JP | 3-294541 A | 12/1991 |
| JP | 3029534 B2 | 2/2000 |
| JP | 2005-133032 A | 5/2005 |
| WO | 2006/112487 A1 | 10/2006 |

* cited by examiner

MOLDED ARTICLE CONTAINING STACKED CARBON FIBER AND METHOD FOR PRODUCING SAME

TECHNICAL FIELD

This invention relates to a carbon fiber-containing stacked molded article, which has all of sufficient tensile strength, sufficient flexural strength (both types of strength will hereinafter be collectively referred to simply as "strength") and peel resistance, and which is useful particularly as a heat insulating material for a high temperature furnace; and a method for producing the carbon fiber-containing stacked molded article.

BACKGROUND ART

Carbon fiber stacked articles are put to various uses, and they find use particularly as high temperature heat insulating materials, etc. Characteristics required as high-temperature heat insulating materials are excellent heat insulating performance, light weight, and adequate strength. Carbon fiber stacked articles are materials fulfilling these required characteristics sufficiently, but the suppression of dust formation and further improvement in surface hardness are demanded of them.

A molded article having a graphite sheet or a carbon fiber cloth (woven cloth, woven fabric) stuck thereto (Patent Document 1) has been proposed as a measure meeting such a demand. Such a proposal, however, still poses the problem that production efficiency is not balanced against performance, and the problem that desired effects are not obtained.

Patent Document 1: Japanese Patent 3029534
Patent Document 2: JP-A-3-248838
Patent Document 3: JP-A-2-208264
Patent Document 4: JP-UM-A-63-97797
Patent Document 5: JP-UM-A-61-138998
Patent Document 6: JP-A-2005-133032

DISCLOSURE OF THE INVENTION

Problems to be Solved by the Invention

It is an object of the present invention to provide a molded article, especially a heat insulating material for a high temperature furnace, which resolves the problems of conventional technologies, and which has both of sufficient strength and peel resistance.

Means for Solving the Problems

The inventors of the present invention diligently conducted studies in an attempt to resolve the above-mentioned problems. As a result, the inventors have found that a woven fabric obtained from spun yarns consisting only of carbon fibers having an average fiber diameter exceeding 12 μm is weak in the tensile strength of the woven fabric itself, and is low in the effect of protecting the surface of a molded article including a substrate and a woven fabric layer. The inventors have also found that a woven fabric obtained from spun yarns consisting only of carbon fibers having an average fiber diameter of 12 μm or less is high in cost, and is so low in adhesiveness between the substrate and the woven fabric layer that peeling easily occurs. Further studies based on these findings have led the inventors to find that the aforementioned object can be attained by using a woven fabric including carbon fiber spun yarns comprising carbon fibers having different average fiber diameters. The present invention has been accomplished based on this finding.

That is, the present invention provides a carbon fiber-containing stacked molded article comprising a substrate composed of first carbon fibers piled, and a woven fabric layer located on at least one surface of the substrate, the woven fabric layer being composed of carbon fiber spun yarns including second carbon fibers having an average fiber diameter of 12 μm or less, and third carbon fibers having an average fiber diameter in excess of 12 μm.

The substrate used in the present invention comprises a pile of the first carbon fibers. Concretely, the substrate usable preferably is a stacked body formed by impregnating a stack of felts, which comprise the first carbon fibers, with a thermosetting resin; or a carbon fiber stacked body formed by impregnating a stack of felts, which comprise the first carbon fibers, with a thermosetting resin, and then heat-treating the impregnated stack of felts. The carbon fiber stacked body formed by impregnating a stack of felts, which comprise the first carbon fibers, with a thermosetting resin, and then heat-treating the impregnated stacked body of felts is more preferred because of its excellent dimensional stability.

As the first carbon fibers, carbon fibers having an average fiber diameter of 5 to 20 μm are preferred, and those having an average fiber diameter of 8 to 18 μm can be used more preferably. The range of 5 to 20 μm is preferred, because the average fiber diameter of less than 5 μm may result in a decreased production efficiency, and the average fiber diameter in excess of 20 μm may lead to decline in heat insulating properties. The fiber length of the first carbon fibers is preferably in the range of 30 to 500 mm, and more preferably in the range of 50 to 250 mm. The range of 30 to 500 mm is preferred, because the fiber length of less than 30 mm may lower the flexural strength of the substrate, whereas the fiber length exceeding 500 mm may make it difficult to disperse the fibers uniformly and form a uniform felt. Preferred examples of the first carbon fibers are pitch-based isotropic carbon fibers, polyacrylonitrile-based (PAN-based) carbon fibers, rayon-based carbon fibers, and Kynol carbon fibers.

The substrate is the first carbon fibers of one type or two or more types formed into a felt. The felt can be formed according to the customary method, and the substrate may be composed of a single felt or a stack of two or more types of felts.

The thickness of the substrate differs according to uses. If the molded article of the present invention is used as a heat insulating material for a high temperature furnace, the thickness range of 10 to 500 mm is usually preferred, and the range of 10 to 300 mm is further preferred. If the thickness of the substrate is too large, productivity decreases. If the thickness of the substrate is too small, heat insulating properties lower.

The bulk density of the substrate is preferably in the range of 0.05 to 0.50 g/cm$^3$, and more preferably in the range of 0.10 to 0.30 g/cm$^3$. If the bulk density is less than 0.05 g/cm$^3$, productivity may lower. If the bulk density exceeds 0.50 g/cm$^3$, heat conductivity may become high, and heat insulating properties may lower. Thus, the above-mentioned range is preferred.

The woven fabric layer used in the present invention is located on at least one surface of the above substrate. Preferably, the woven fabric layer is located on both surfaces of the substrate, in consideration of an effect as a protective layer for damage prevention against impact and stress from the outside, and the effect of preventing fluffs caused to the substrate from touching the product.

The woven fabric layer includes a woven fabric formed by weaving the carbon fiber spun yarns including the second carbon fibers having an average fiber diameter of 12 μm or less, preferably 5 to 12 μm, and the third carbon fibers having an average fiber diameter in excess of 12 μm, preferably exceeding 12 μm but not more than 20 μm. If the average fiber diameter of the second carbon fibers is less than 5 μm, productivity lowers. If the average fiber diameter of the third carbon fibers exceeds 20 μm, tensile strength lowers, or when the carbon fibers are twisted, yarn breakage is apt to occur.

The carbon fiber spun yarns used in the present invention are preferably spun yarns in which the second carbon fibers are anisotropic carbon fibers, and the third carbon fibers are isotropic carbon fibers. High tensile strength and high modulus of elasticity can be achieved by the second carbon fibers, while satisfactory adhesion to a heat treated material by an adhesive can be achieved by the third carbon fibers. The "anisotropic carbon fibers" refer to carbon fibers having tensile strength of 1,000 MPa or higher, or having modulus of elasticity in tension of 100 GPa or higher, and fibers having a structure in which the (002) carbon layer surfaces are selectively oriented in the fiber axis direction. The corresponding carbon fibers are, for example, carbon fibers showing the following characteristics after heat treatment at 2,000° C. in a non-oxidizing atmosphere: carbon fibers whose higher-order structure is observed by a scanning electron microscope (SEM) used on the cross-section of the carbon fiber; carbon fibers whose optical anisotropy due to the orientation of the (002) carbon layer surfaces is observed by a polarizing microscope; or carbon fibers whose half-value width obtained from the measurement of an orientation function by a goniometer is 50 degrees or less. Preferred examples are polyacrylonitrile-based (PAN-based) carbon fibers, pitch-based anisotropic carbon fibers, and rayon-based carbon fibers. On the other hand, the "isotropic carbon fibers" refer to carbon fibers having tensile strength of less than 1,000 MPa, or having modulus of elasticity in tension of less than 100 GPa, and fibers having a structure in which the (002) carbon layer surfaces are not oriented. The corresponding carbon fibers are, for example, carbon fibers showing the following characteristics after heat treatment at 2,000° C. in a non-oxidizing atmosphere: carbon fibers whose isotropic structure is observed by a scanning electron microscope (SEM) used on the cross-section of the carbon fiber; carbon fibers whose optical isotropy due to the orientation of the (002) carbon layer surfaces is observed by a polarizing microscope; or carbon fibers whose half-value width obtained from the measurement of an orientation function by a goniometer is more than 50 degrees. Preferred examples are pitch-based isotropic carbon fibers.

The second carbon fibers usually have a maximum fiber length of 20 m or less in the molded article. Fibers as raw materials (hereinafter referred to as starting fibers), which constitute the second carbon fibers, usually have an average fiber length of preferably 500 mm or more, more preferably 1,000 mm or more, and further preferably 3 m or more. The upper limit of the average fiber length of the starting fibers constituting the second carbon fibers is not set, and can be selected, as appropriate, from available fiber lengths in accordance with uses. Normally, continuous fibers of 5,000 m or less are industrially available. In spun yarns, the longer the fibers used, the fewer the points of connection of the fibers, so that the strength of the spun yarns can be enhanced. The average fiber length of the starting fibers constituting the third carbon fibers is less than 500 mm, preferably 300 mm or less, and more preferably 200 mm or less, if the starting fibers are normally industrially available. Furthermore, it is particularly preferred that 3 to 30% by mass, preferably 5 to 20% by mass, of carbon fibers having an average fiber length of 150 mm or more, but less than 500 mm be contained, and 97 to 70% by mass, preferably 95 to 80% by mass, of carbon fibers having an average fiber length of less than 150 mm be contained. If the content of the carbon fibers having an average fiber length of 150 mm or more is too low, the tensile strength of the carbon fiber spun yarns lowers. If the content of the carbon fibers having an average fiber length of 150 mm or more is too high, yarn breakage is apt to occur during the spinning step, and variations in fineness occur. As a result, lumpy parts called slubs or flies tend to appear, leading to deteriorated quality.

The density of the second carbon fibers is preferably in the range of 1.65 to 2.30 g/cm$^3$, more preferably in the range of 1.70 to 2.00 g/cm$^3$, and particularly preferably in the range of 1.70 to 1.90 g/cm$^3$. If the density of the second carbon fibers is too low, carbonization is insufficient. If the density of the second carbon fibers is too high, crystallization proceeds too greatly. In either case, strength lowers, presenting difficulty in performing the function, as the second carbon fibers, of enhancing the strength of the woven fabric. The density of the third carbon fibers is preferably in the range of 1.50 to 1.80 g/cm$^3$, more preferably in the range of 1.50 to 1.70 g/cm$^3$, and particularly preferably in the range of 1.55 to 1.70 g/cm$^3$. If the density of the third carbon fibers is too low, carbonization is insufficient, and the strength of the carbon fibers lowers. If the density of the third carbon fibers is too high, wettability with a resin (adhesive) becomes poor, presenting difficulty in performing the function, as the third carbon fibers, of adhering the woven fabric to the substrate.

The mass per 1000 m of the carbon fiber spun yarn (it refers as fineness) constituted from the second carbon fibers and the third carbon fibers is preferably 30 to 1,000 tex, more preferably 30 to 750 tex, further preferably 60 to 400 tex. These ranges are preferred, because values lower than the above ranges result in the increased manufacturing cost of the spun yarns, while values higher than the above ranges may make it difficult to produce the woven fabric.

The tensile strength of the spun yarns directly affects the tensile strength of the woven fabric. The bearer of responsibility for the tensile strength is the small-diameter, long carbon fibers which are the second carbon fibers. The tensile strength of the second carbon fibers (the tensile strength of carbon fibers is measured in accordance with JIS R 7601-1986) is preferably 1,000 MPa or higher, and particularly preferably in the range of 1,600 MPa to 6,000 MPa. The tensile strength of the third carbon fibers is preferably less than 1,000 MPa, and particularly preferably in the range of 300 to 900 MPa. Since the third carbon fibers are large-diameter, short carbon fibers, and involve many fluffs, they are presumed to show an anchoring effect. Alternatively, the third carbon fibers have high adhesiveness to the adhesive, so that they are assumed to perform the function of maintaining adhesion to the substrate in a sufficiently high state.

However, the strength of the woven fabric is influenced by the method of weaving, the number of twists of the spun yarns, etc. as well as the tensile strength of the spun yarns. For example, some twists increase the tensile strength, but too many twists decrease the tensile strength because of torsion or tensile stress. The number of twists of the carbon fiber spun yarns (intended for putting together the spun yarns and imparting tensile strength to the spun yarns) is preferably in the range of 50 to 400 twists/m, more preferably in the range of 100 to 200 twists/m. Too many twists may destroy the spun yarns, whereas few twists tend to lower the tensile strength of the spun yarns. Thus, the number of twists within the above ranges is preferred. The tensile strength of the woven fabric as a whole is 0.2 kN or more, preferably in the range of 0.2 to 2.0 kN. The tensile strength of such a value can be achieved by the selection of the second carbon fibers, the proportions of the second carbon fibers and the third carbon fibers blended, the number of twists of the spun yarns, the thickness of the woven fabric, and the mass per unit area of the woven fabric.

The flexural strength of the molded article is 1.5 MPa or more, but less than 5.0 MPa, preferably 1.8 MPa or more, but less than 5.0 MPa. This flexural strength can also be achieved by adjusting the blend ratio between the second carbon fibers and the third carbon fibers. The second carbon fibers preferred for obtaining the molded article of the present invention are concretely desired to be selected from a group of high strength, small diameter, long carbon fibers consisting of pitch-based anisotropic carbon fibers (long fibers), polyacrylonitrile-based (PAN-based) carbon fibers, and rayon-based carbon fibers, which have an average fiber diameter of 5 μm or more, but 12 μm or less, a maximum fiber length of 20 m or less in the molded article, a density in the range of 1.65 to 2.30 g/cm$^3$, and tensile strength of 1,000 MPa or higher, but 6,000 MPa or lower. The third carbon fibers are concretely desired to be selected from a group of low strength, large diameter, short carbon fibers consisting of pitch-based isotropic carbon fibers (short fibers) having an average fiber diameter of more than 12 μm, but 20 μm or less, a density in the range of 1.50 to 1.80 g/cm$^3$, and tensile strength of less than 1,000 MPa. The third carbon fibers are preferably spun yarns containing 3 to 30% by mass of starting fibers having an average fiber length of less than 500 mm and 97 to 70% by mass of starting fibers having an average fiber length of less than 150 mm.

More preferably, the carbon fiber spun yarns are spun yarns of a core-sheath structure having the second carbon fibers as a core material and the third carbon fibers as a sheath material; doubled and twisted spun yarns composed of spun yarns comprising the second carbon fibers and spun yarns comprising the third carbon fibers; doubled and twisted spun yarns composed of spun yarns of a core-sheath structure having the second carbon fibers as a core material and the third carbon fibers as a sheath material; and combinations thereof. Publicly known methods, such as a twill weave, a plain weave, a satin weave, and a basket weave, can be adopted as the method of weaving these spun yarns.

The proportions of the second carbon fibers and the third carbon fibers blended are such that the amount of the second carbon fibers blended is preferably 10% by mass or more, but 90% by mass or less, more preferably 20% by mass or more, but 80% by mass or less, and further preferably 30% by mass or more, but 70% by mass or less. If the amount of the second carbon fibers blended is less than 10% by mass, the strength of the spun yarns may be insufficient. If the amount of the second carbon fibers blended exceeds 90% by mass, adhesiveness between the spun yarns and the substrate may lower, and it may be impossible to ensure the (flexural) strength of the molded article. The woven fabric layer may contain spun yarns comprising other carbon fibers, for example, spun yarns consisting only of the second carbon fibers or spun yarns consisting only of the third carbon fibers, unless as the desired effects of the present invention are impeded.

The method of producing the carbon fiber spun yarns is not limited. For example, when a bundle 32 of the third carbon fibers is drawn and twisted using a fine spinning machine 100 shown in FIG. 3, a bundle 36 of the second carbon fibers may be charged via middle rollers 37 into the bundle 32 and mixed therewith. In the fine spinning machine 100 shown in FIG. 3, the bundle 32 of the third carbon fibers is fed from a product case 31, and guided to back rollers 34 via a creel stand roller 33, while the bundle 36 of the second carbon fibers fed from a carbon fiber bobbin 35 is charged via the middle rollers 37. The bundles of the second and third carbon fibers are passed between an apron roller 38 and a bottom roller 39 and between front rollers 40. During this passage, the bundle 32 of the third carbon fibers is drawn by a peripheral speed ratio between the front rollers 40 and the back rollers 34, and at the same time, is combined with the second carbon fiber bundle 36. The combined bundles of the second and third carbon fibers are passed on a snail guide 41, twisted by a spindle 44 having a ring 42 and a brake pedal 43, and wound up by a take-up bobbin 45 to obtain carbon fiber spun yarns.

The weight per unit area (FAW) of the woven fabric layer formed by weaving the thus obtained carbon fiber spun yarns is preferably 50 to 1,200 g/m$^2$, more preferably 200 to 800 g/m$^2$. The greater the weight per unit area, it is natural that the larger the number of the spun yarns becomes and the stronger the woven fabric layer becomes. However, the woven fabric layer becomes thicker, resulting in decreased moldability (difficulty in providing an allowance for thickness). Thus, the above-mentioned ranges are preferred. The thickness of the woven fabric layer is preferably 0.1 to 2.0 mm, more preferably 0.6 to 1.1 mm.

In the molded article of the present invention, the aforementioned substrate and the aforementioned woven fabric layer are preferably joined together via an adhesive. The adhesive usable for this purpose is an adhesive containing carbon fibers with the length of short fibers, or an adhesive containing a graphite powder.

As the adhesive, there can be used an adhesive composition containing the following components uniformly mixed and dispersed therein: 60 to 100 parts by mass of a thermosetting prepolymer, 20 to 60 parts by mass of a thermosetting resin; 5 to 20 parts by mass of short fiber-length carbon fibers, carbon black, a carbon powder or a graphite powder; 5 to 20 parts by mass of a solvent; and 5 to 20 parts by mass of water. Preferred examples of the thermosetting prepolymer are a urea resin prepolymer; a melamine resin prepolymer, a urea-modified melamine resin prepolymer; a guanamine resin prepolymer; a guanamine-modified melamine resin prepolymer; a furan resin prepolymer; an alkyd resin prepolymer; a phenolic resin prepolymer, for example, a novolak type phenolic resin prepolymer, a resol type phenolic resin prepolymer, a novolak type alkylphenolic resin prepolymer, a resol type alkylphenolic resin prepolymer, and a xylene/formaldehyde condensate or a toluene/formaldehyde condensate of any of them, or any of these resin prepolymers modified with a melamine resin, a guanamine resin or a urea resin; an epoxy resin prepolymer, for example, bisphenol A diglycidyl ether, a diglycidyl ether of an alicyclic dialcohol, bisphenol A bis(α-methylglycidylether), or bis(α-methylglycidylether) of an alicyclic dialcohol. If necessary, a curing agent, a curing catalyst, etc. may be incorporated. Of them, the resin prepolymer presenting a high carbonization yield is preferred. A novolak type phenolic resin prepolymer, a resol type phenolic resin prepolymer, a novolak type alkylphenolic resin prepolymer, or a resol type alkylphenolic resin prepolymer can be used particularly preferably. Preferred examples of the thermosetting resin are a urea resin; a melamine resin; a urea-modified melamine resin; a guanamine resin; a guanamine-modified melamine resin; an alkyd resin; a furan resin; an unsaturated polyester resin; a phenolic resin, for example, a novolak type phenolic resin, a resol type phenolic resin, a novolak type alkylphenolic resin, or a resol type alkylphenolic resin; and an epoxy resin, for example, bisphenol A diglycidyl ether, a diglycidyl ether of an alicyclic dialcohol, bisphenol A bis(α-methylglycidylether), or bis(α-methylglycidylether) of an alicyclic dialcohol. Of them, the resin presenting a high carbonization yield is preferred. A novolak type phenolic resin, a resol type phenolic resin, a novolak type alkylphenolic resin, or a resol type alkylphenolic resin can be used particularly preferably. As the solvent, acetone, methyl ethyl ketone, methyl isobutyl ketone, methanol, ethanol, 2-furylmethanol, toluene, xylene, or dimethyl sulfoxide can be used preferably. The amount of the adhesive used is preferably 300 to 1,000 g/m$^2$, more preferably 400 to 800 g/m$^2$, based on the substrate. The amount of the adhesive used is preferably 500 to 3,000 g/m$^2$, more preferably 1,000 to 2,500 g/m$^2$, per woven fabric.

Concrete examples of the molded article of the present invention are a molded heat insulating material processed into a flat plate form, a cylindrical form, a disk form, or a square from, especially, a heat insulating material for a high temperature furnace which is used as a lining for the inner wall of the high temperature furnace.

The molded article of the present invention can be produced, for example, by performing the following steps:

[Substrate Producing Step]

The substrate can be obtained by impregnating a carbon fiber felt with a thermosetting resin impregnating solution or the like. Alternatively, the substrate can be obtained by impregnating a carbon fiber felt with a thermosetting resin impregnating solution or the like, stacking a plurality of the resulting thermosetting resin-impregnated carbon fiber felts, pressurizing and heating the stacked body at a predetermined pressure and a predetermined temperature, at which the thermosetting resin is cured, to compression mold the stacked body, and then further heating the resulting stacked body at a high temperature. Moreover, a spacer of a predetermined thickness is disposed around the stacked body, and then the composite is compression molded. By so doing, the thickness can be adjusted, whereby the bulk density of the stacked body of the felts can be controlled.

A urea resin, a melamine resin, a phenolic resin, an epoxy resin, an unsaturated polyester resin, an alkyd resin, a urethane resin, or a furan resin, for example, can be used preferably as the thermosetting resin. Of these resins, a phenolic resin is preferred.

[Woven Fabric Producing Step]

A woven fabric can be produced in accordance with the customary method with the use of predetermined carbon fiber spun yarns. For example, a woven fabric, such as a plain weave fabric, a twill weave fabric, a satin weave fabric, or a basket weave fabric, can be obtained using a weaving machine, which can be used in weaving ordinary carbon fibers, such as a shuttle loom or a rapier loom.

[Adhesion Step]

Predetermined components are formulated, and uniformly mixed to prepare an adhesive composition. The resulting adhesive is coated in a predetermined amount on both of the substrate and the woven fabric, and the substrate and the woven fabric are stuck together. A method of coating the adhesive on the woven fabric may be to coat the adhesive in the predetermined amount by a spatula, a brush, or a roller. Alternatively, the coating method may be to immerse the woven fabric in the adhesive in a vacuum tank for deaeration under reduced pressure, thereby impregnating the core portions of the spun yarns, which constitute the woven fabric, with the adhesive sufficiently, then withdraw the woven fabric from the vacuum tank, and scrape off the adhesive adhering in excess to the woven fabric with the use of a spatula, a brush, or a roller until a predetermined amount of coating is obtained.

[Heat-Treating Step]

After the substrate and the woven fabric are adhered to each other, the resulting composite is pressurized and heated at a predetermined pressure and a predetermined temperature for compression molding, and the molded product is further heat-treated at 3,000° C. or lower in a non-oxidizing atmosphere.

Advantages of the Invention

The carbon fiber-containing stacked molded article of the present invention is excellent in heat insulating performance, and has both of sufficient strength and peel resistance.

EXPLANATION OF THE REFERENCE NUMERALS

1 Carbon fiber-containing stacked molded article
10 Substrate
20 Woven fabric layer
30 Adhesive
21 Carbon fiber spun yarn
22 Core portion
23 Sheath portion
100 Fine spinning machine

BEST MODE FOR CARRYING OUT THE INVENTION

The present invention will be described in further detail below by reference to the accompanying drawings, but the present invention is not limited to them.

Figure 1:
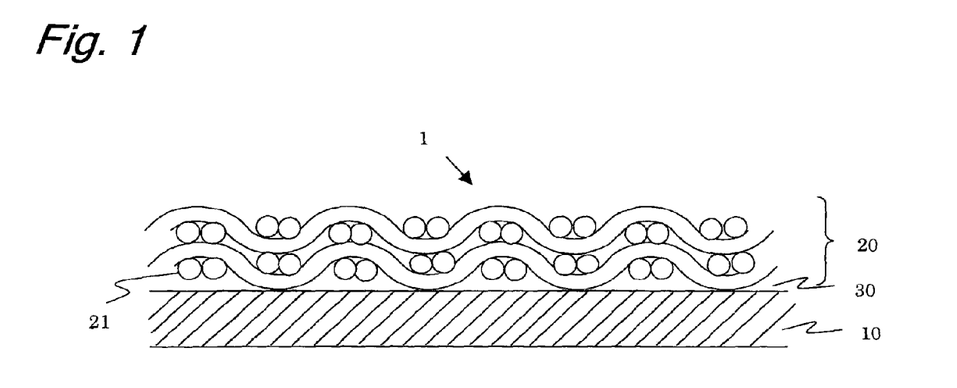
FIG. 1 is a sectional view showing an embodiment of the carbon fiber-containing stacked molded article of the present invention.
Figure 2:
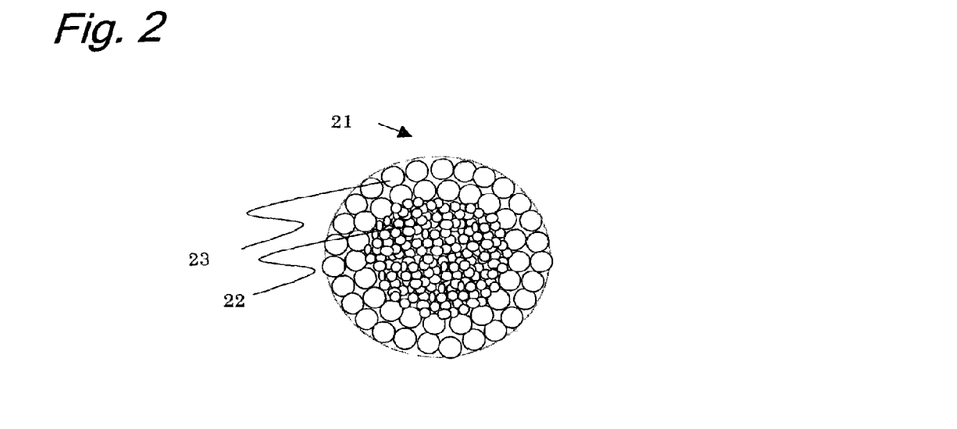
FIG. 2 is a sectional view showing an embodiment of a carbon fiber spun yarn used in the embodiment shown in FIG. 1.

FIG. 1 is a sectional view showing an embodiment of the carbon fiber-containing stacked molded article of the present invention. FIG. 2 is a sectional view showing an embodiment of a carbon fiber spun yarn used in the embodiment shown in FIG. 1.

A carbon fiber-containing stacked molded article 1 of a form shown in FIG. 1 is composed of a substrate 10 comprising a carbon fiber felt stack, a woven fabric layer 20 comprising a woven fabric formed by twill weaving carbon fiber spun yarns 21, and an adhesive 30 for adhering the substrate 10 and the woven fabric layer 20 to each other.

As shown in FIG. 2, the carbon fiber spun yarn 21 used to form the woven fabric layer 20 in the present embodiment consists of a core portion 22, and a sheath portion 23 covering the outer periphery of the core portion 22. The core portion 22 is formed from second carbon fibers having a small average fiber diameter (preferably, 5 µm to 12 µm), while the sheath portion 23 is formed from third carbon fibers having a large average fiber diameter (preferably, in excess of 12 μm).

It is to be noted that the present invention is not limited at all by the above embodiment, and various changes and modifications may be made without departing from the gist of the present invention.

For example, the carbon fiber spun yarn constituting the woven fabric layer 20 may be of a twisted yarn structure, rather than of a core-sheath structure.

EXAMPLES

Hereinbelow, the present invention will be described concretely by the Examples, which in no way limit the present invention. Evaluations made in the Examples are as follows:

[Density of Carbon Fibers]

Predetermined amounts of zinc chloride and 1% hydrochloric acid were metered into a beaker, and then mixed to form a mixed solution. The mixed solution was transferred into a graduated cylinder (500 ml), which was dipped in a low temperature thermostatic water bath at 20±1.0° C. to be brought to a temperature of 20±1.0° C. Then, a gravimeter was floated to measure the specific gravity of the mixed solution. Relative amounts of zinc chloride and 1% hydrochloric acid were varied, as appropriate, to prepare solutions having ten specific gravities.

These solutions having the ten specific gravities were gently poured into a 20 ml graduated cylinder, down the wall of the graduated cylinder, in an amount of 2 ml each in order of decreasing specific gravity, to make a density gradient tube. Separately, about 0.1 g of the carbon fiber sample, which had been ground in a mortar and passed through a standard sieve of 150 μm mesh, was dispersed in a small amount of ethanol to obtain a sample dispersion. The density gradient tube was dipped in a low temperature thermostatic water bath at 20±1.0° C., and after a lapse of 30 minutes, the sample dispersion was gently charged into the density gradient tube. After the density gradient tube was allowed to stand for 12 hours or more, the position of the sample in the density gradient tube was read, and the density of the sample was determined using a density conversion table.

[Tensile Strength of Carbon Fibers]

As the tensile strength of the carbon fibers, the tensile strength of the single carbon fiber was measured in accordance with JIS R 7601-1986.

[Tensile Strength of Spun Yarn Woven Fabric]

The spun yarn woven fabric was pulled using a TENSILON universal testing machine ("RTC-1310", ORIENTEC Co., Ltd.) under the following conditions: load cell rating 10 kN, sample length 150 mm, sample width 50 mm, and rate of pulling 200 mm/min. Breaking strength found under these conditions was converted into a value per cm of the sample width, and this value was taken as the tensile strength of the spun yarn woven fabric.

[Thickness of Spun Yarn Woven Fabric]

A sample (100 mm×100 mm) was obtained from the spun yarn woven fabric by cutting the spun yarn woven fabric at a part 30 mm or more inwardly of its end. The center of the sample was measured by a micrometer (U-shaped micrometer "PMU 150-2", Mitutoyo Corporation), and the measured value was taken as the thickness of the spun yarn woven fabric.

[Flexural Strength]

Five samples measuring 10 mm in width, 13 to 15 mm in thickness, and 100 mm in length were cut out of the resulting carbon fiber-containing stacked molded article by machining. The samples were subjected to a bending test by center-concentrated load with the use of an autograph ("Shimadzu Autograph AGS-H 5 kN", Shimadzu Corporation) under the following conditions: support span 80 mm, crosshead speed 1.0 mm/min, support for plastics, and punch with radius r=5 mm. The flexural strength was determined based on maximum breaking load.

Example 1

Substrate Producing Step

One hundred parts by mass of each of two types of pitch-based isotropic carbon fiber felts having a bulk density of 0.08 g/cm$^3$ ("KRECA FELT F-105" and "KRECA FELT F-110", KUREHA CORPORATION) were impregnated with 44 parts by mass of a commercially available phenolic resin impregnating solution ("Shonol BRS-3897", SHOWA HIGHPOLYMER CO., LTD.). Then, the felt of one of the types and the felt of the other type were stacked to form a stack. A spacer for adjusting the thickness of the substrate to 10 mm was disposed around the resulting stack. Then, the stack was compression molded into a flat plate form for 35 minutes at a temperature of 175° C. at a pressure of 0.5 MPa. The resulting compression molded stacked body was graphitized under vacuum for 1 hour at 2,000° C. to obtain a substrate as a flat plate-shaped carbon fiber stacked body having a thickness of 10 mm, a width of 200 mm, a length of 250 mm, and a bulk density of 0.16 g/cm$^3$.

[Woven Fabric Producing Step]

Figure 3:
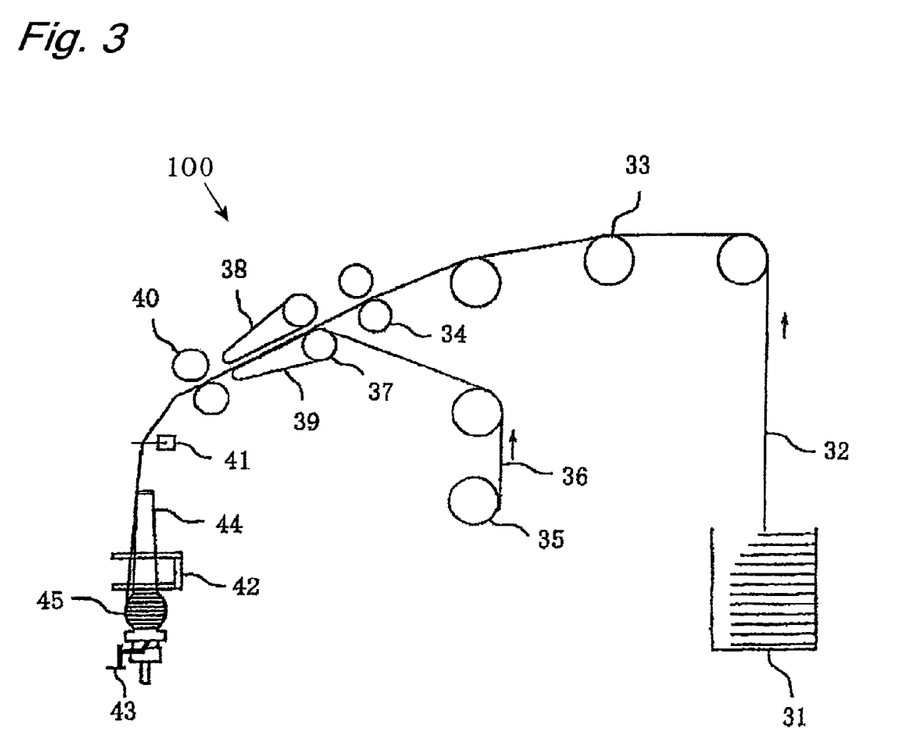
FIG. 3 is a schematic view showing a manufacturing process for the carbon fiber spun yarn used in the present invention.

A carbon fiber spun yarn of a core-sheath structure composed of 20% by mass of a core portion comprising second carbon fibers and 80% by mass of a sheath portion comprising third carbon fibers was prepared by using polyacrylonitrile-based (PAN-based) carbon fibers ("BESFIGHT HTA-3K" produced by TOHO TENAX Co., Ltd., divided, 80 tex, average fiber diameter 7 μm, density 1.77 g/cm$^3$) as the second carbon fibers and pitch-based isotropic carbon fibers ("KRECA SLIVER" produced by KUREHA CORPORATION, 320 tex, average fiber diameter 14.5 μm, density 1.63 g/cm$^3$) as the third carbon fibers and using the fine spinning machine shown in FIG. 3. The carbon fiber spun yarns were twill woven as warp yarns and filling yarns to form a spun yarn woven fabric (twill weave, FAW 580 g/m$^2$, count 19.0 yarns/inch, tensile strength 0.32 kN, thickness 0.88° mm). This spun yarn woven fabric was cut into 4 pieces each measuring 220 mm in width and 270 mm in length to obtain a woven fabric constituting a woven fabric layer.

[Adhesion Step]

Eighty parts by mass of a phenolic resin impregnating solution ("Shonol BRS-3897", SHOWA HIGHPOLYMER CO., LTD.), 40 parts by mass of a powdery phenolic resin ("Cashew No. 05", Cashew Co., Ltd.), 13 parts by mass of short carbon fibers ("KRECA CHOP M-107T" produced by KUREHA CORPORATION, average fiber length 0.4 mm, L/D about 28, density 1.63 g/cm$^3$), 13 parts by mass of 2-furylmethanol (genuine 1st grade, JUNSEI CHEMICAL CO., LTD.), and 11 parts by mass of water were uniformly mixed and dispersed to prepare an adhesive composition for use as an adhesive for adhering the substrate and the spun yarn woven fabric. This adhesive was coated on one surface of each of the woven fabrics at a weight per unit area of 2,000 g/m$^2$ by use of a brush, and the entire surface of each side of the substrate was coated with the adhesive at a weight per unit area of 400 g/m$^2$ by use of a spatula. Two of the woven fabrics were stacked on each side of the substrate, and adhered thereto, with the adhesive-coated surface of the woven fabric facing the substrate. The resulting composite was compression molded for 60 minutes at a temperature of 175° C. and a pressure of 0.1 MPa or lower by use of a compression molding machine ("F-37", SHINTO Metal Industries Corporation).

[Heat-Treating Step]

The compression molded product was further graphitized for 1 hour at 2,000° C. in a vacuum to obtain a flat plate-shaped carbon fiber-containing stacked molded article having two of the spun yarn woven fabric layers stacked on each surface of the substrate. No peeling and no blisters of the spun yarn woven fabric were observed in the resulting molded article.

Figure 4:
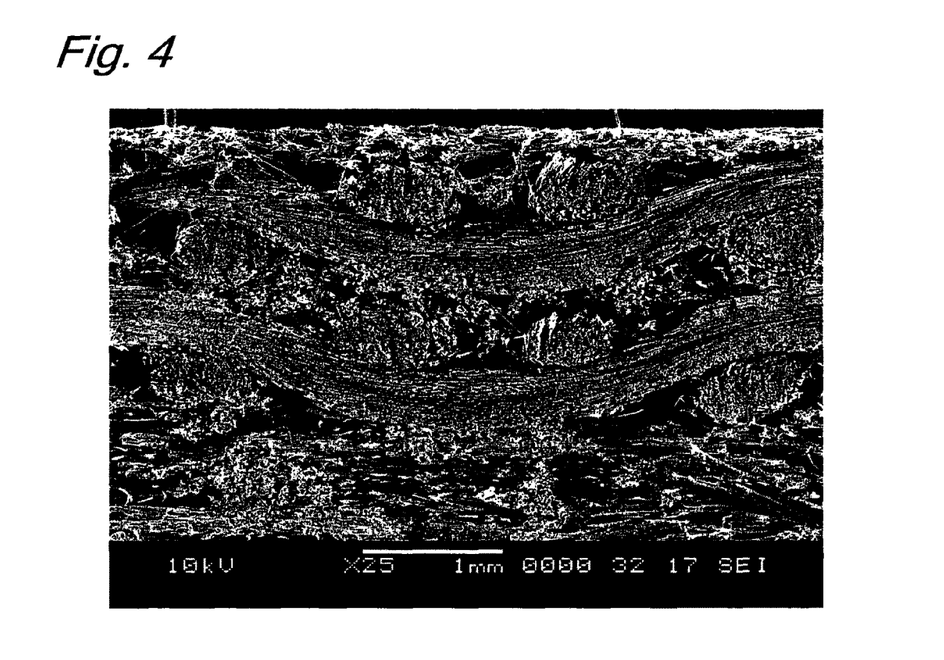
FIG. 4 is an SEM photograph showing an enlarged cross section (×25) of a molded article obtained in Example 1.
Figure 5:
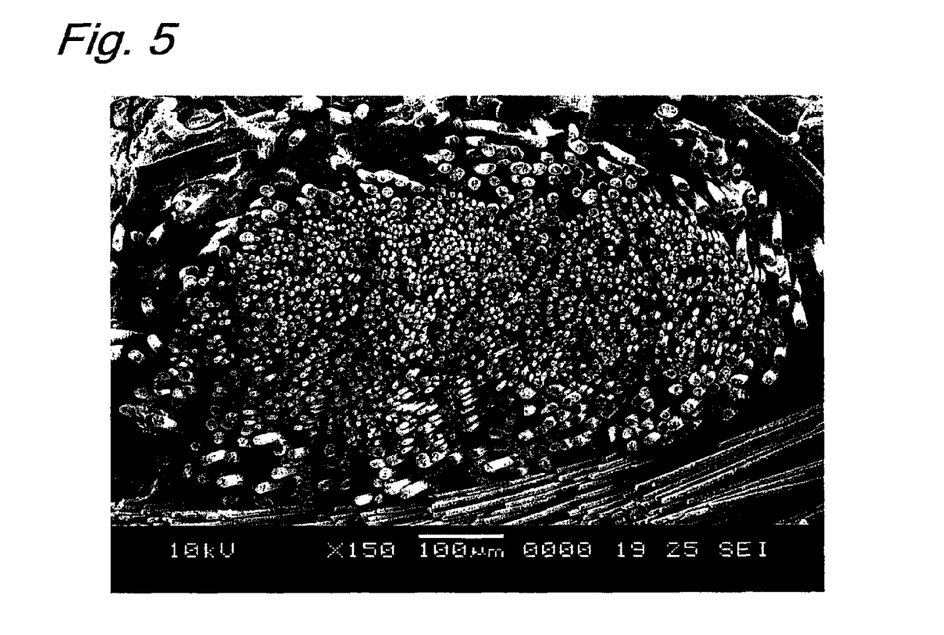
FIG. 5 is an SEM photograph showing an enlarged cross section (×150) of a carbon fiber spun yarn of a core-sheath structure used in Example 1.
Figure 6:
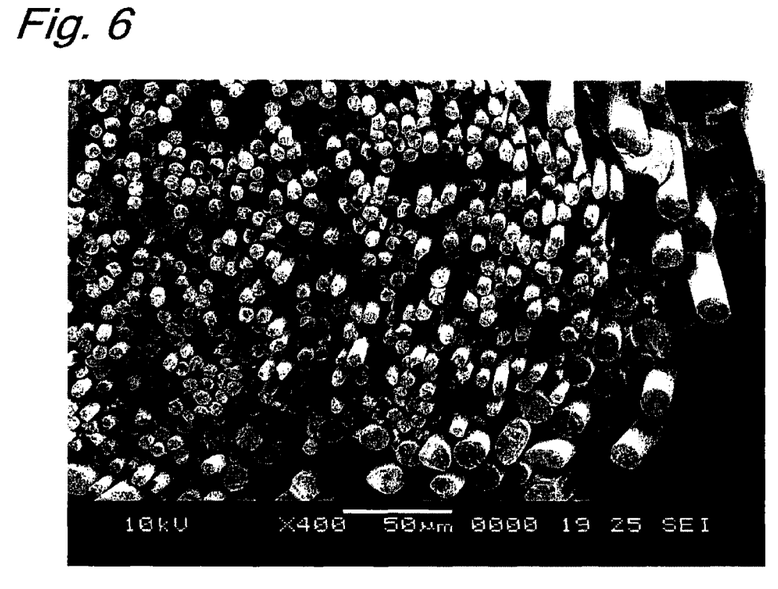
FIG. 6 is an SEM photograph showing a part of FIG. 5 on an enlarged scale (×400).
Figure 7:
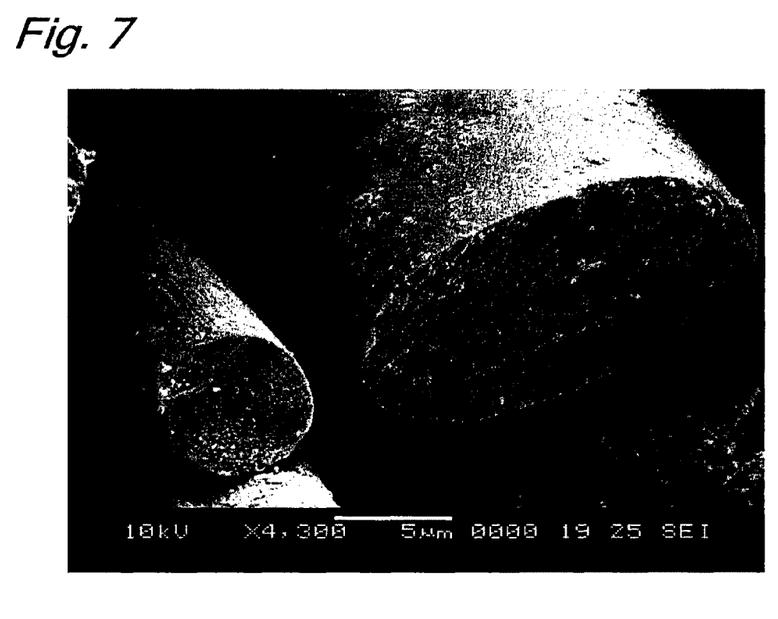
FIG. 7 is an SEM photograph showing a second carbon fiber portion and a third carbon fiber portion in FIG. 5 on an enlarged scale (×4300).

A photograph showing the cross section of the resulting molded article is shown in FIG. 4. Photographs of the enlarged cross section of the carbon fiber spun yarn used are shown in FIGS. 5 to 7.

The composition of the carbon fiber spun yarn used is shown in Table 1, and the results of evaluations of the resulting molded article are shown in Table 2.

Example 2

A spun yarn was prepared by using polyacrylonitrile-based (PAN-based) carbon fibers ("BESFIGHT HTA-3K" produced by TOHO TENAX Co., Ltd., 200 tex, average fiber diameter 7 μm, density 1.77 g/cm$^3$) as a core portion, and pitch-based isotropic carbon fibers ("KRECA SLIVER" produced by KUREHA CORPORATION, 200 tex, average fiber diameter 14.5 μm, density 1.63 g/cm$^3$) as a sheath portion, and setting the blend proportions of both types of carbon fibers at 50% by mass each. A woven fabric was formed using the resulting spun yarns (twill weave, FAW 580 g/m$^2$, count 19.0 yarns/inch, tensile strength 0.52 kN, thickness 0.88 mm). A molded article was obtained in the same manner as in Example 1, except for the use of this woven fabric. No peeling and no blisters of the spun yarn woven fabric were observed in the resulting molded article.

The composition of the carbon fiber spun yarn used is shown in Table 1, and the results of evaluations of the resulting molded article are shown in Table 2.

Example 3

A spun yarn was prepared by using polyacrylonitrile-based (PAN-based) carbon fibers ("BESFIGHT HTA-6K" produced by TOHO TENAX Co., Ltd., divided, 320 tex, average fiber diameter 7 μm, density 1.77 g/cm$^3$) as a core portion, and pitch-based isotropic carbon fibers ("KRECA SLIVER" produced by KUREHA CORPORATION, 80 tex, average fiber diameter 14.5 μm, density 1.63 g/cm$^3$) as a sheath portion, and setting the blend proportions of the former carbon fibers and the latter carbon fibers at 80% by mass and 20% by mass, respectively. A woven fabric was formed using the resulting spun yarns (twill weave, FAW 580 g/m$^2$, count 19.0 yarns/inch, tensile strength 0.70 kN, thickness 0.88 mm). A molded article was obtained in the same manner as in Example 2, except for the use of this woven fabric. No peeling and no blisters of the spun yarn woven fabric were observed in the resulting molded article.

The composition of the carbon fiber spun yarn used is shown in Table 1, and the results of evaluations of the resulting molded article are shown in Table 2.

Example 4

A molded article was obtained in the same manner as in Example 2, except that the number of the stacked woven fabrics was one on each surface of the substrate. No peeling and no blisters of the spun yarn woven fabric were observed in the resulting molded article.

The composition of the carbon fiber spun yarn used is shown in Table 1, and the results of evaluations of the resulting molded article are shown in Table 2.

Example 5

A molded article was obtained in the same manner as in Example 4, except that as the heat-treating step, carbonization was performed for 1 hour at 1,200° C. at normal pressure in a nitrogen atmosphere, instead of graphitization. No peeling and no blisters of the spun yarn woven fabric were observed in the resulting molded article.

The composition of the carbon fiber spun yarn used is shown in Table 1, and the results of evaluations of the resulting molded article are shown in Table 2.

Example 6

A spun yarn was prepared by using pitch-based anisotropic carbon fibers ("DIALEAD K32112" produced by Mitsubishi Chemical Functional Products, Inc., divided, 200 tex, average fiber diameter 10 μm, density 1.93 g/cm$^3$) as a core portion, and pitch-based isotropic carbon fibers ("KRECA SLIVER" produced by KUREHA CORPORATION, 200 tex, average fiber diameter 14.5 μm, density 1.63 g/cm$^3$) as a sheath portion, and setting the blend proportions of both types of carbon fibers at 50% by mass each. A woven fabric was formed using the resulting spun yarns (twill weave, FAW 580 g/m$^2$, count 19.0 yarns/inch, tensile strength 0.28 kN, thickness 0.88 mm). A molded article was obtained in the same manner as in Example 2, except for the use of this woven fabric. No peeling and no blisters of the spun yarn woven fabric were observed in the resulting molded article.

The composition of the carbon fiber spun yarn used is shown in Table 1, and the results of evaluations of the resulting molded article are shown in Table 2.

Example 7

A molded article was obtained in the same manner as in Example 2, except for the use of a woven fabric (plain weave, FAW 530 g/m$^2$, count 19.0 yarns/inch, tensile strength 0.64 kN, thickness 0.78 mm) formed by plain weaving the carbon fiber spun yarns prepared in Example 2. No peeling and no blisters of the spun yarn woven fabric were observed in the resulting molded article.

The composition of the carbon fiber spun yarn used is shown in Table 1, and the results of evaluations of the resulting molded article are shown in Table 2.

Example 8

A molded article was obtained in the same manner as in Example 2, except for the use of a woven fabric (twill weave, FAW 310 g/m$^2$, count 10.0 yarns/inch, tensile strength 0.26 kN, thickness 0.62 mm) obtained by using the carbon fiber spun yarns prepared in Example 2 and changing the weaving conditions (FAW and count). No peeling and no blisters of the spun yarn woven fabric were observed in the resulting molded article.

The composition of the carbon fiber spun yarn used is shown in Table 1, and the results of evaluations of the resulting molded article are shown in Table 2.

Example 9

A molded article was obtained in the same manner as in Example 2, except for the use of a woven fabric (twill weave, FAW 670 g/m², count 22.0 yarns/inch, tensile strength 0.60 kN, thickness 1.08 mm) obtained by using the carbon fiber spun yarns prepared in Example 2 and changing the weaving conditions (FAW and count). No peeling and no blisters of the spun yarn woven fabric were observed in the resulting molded article.

The composition of the carbon fiber spun yarn used is shown in Table 1, and the results of evaluations of the resulting molded article are shown in Table 2.

Example 10

A molded article was obtained in the same manner as in Example 2, except that a stacked body with a thickness of 10 mm, a width of 200 mm, a length of 250 mm, and a bulk density of 0.10 g/cm³ prepared by compression molding a pitch-based isotropic carbon fiber felt having a bulk density of 0.08 g/cm³ ("KRECA FELT F-110", KUREHA CORPORATION) into a flat plate form for 25 minutes at a temperature of 175° C. and a pressure of 0.5 MPa was used as the substrate. No peeling and no blisters of the spun yarn woven fabric were observed in the resulting molded article.

The composition of the carbon fiber spun yarn used is shown in Table 1, and the results of evaluations of the resulting molded article are shown in Table 2.

Example 11

A molded article was obtained in the same manner as in Example 2, except that a stacked body with a thickness of 10 mm, a width of 200 mm, a length of 250 mm, and a bulk density of 0.30 g/cm³ prepared by compression molding three pitch-based isotropic carbon fiber felts having a bulk density of 0.08 g/cm³ ("KRECA FELT F-110", KUREHA CORPORATION) into a flat plate form for 80 minutes at a temperature of 175° C. and a pressure of 0.6 MPa was used as the substrate. No peeling and no blisters of the spun yarn woven fabric were observed in the resulting molded article.

The composition of the carbon fiber spun yarn used is shown in Table 1, and the results of evaluations of the resulting molded article are shown in Table 2.

Example 12

A molded article was obtained in the same manner as in Example 2, except that as the heat-treating step for the carbon fiber-containing stacked body, carbonization was performed for 1 hour at 1,200° C. at normal pressure in a nitrogen atmosphere, instead of graphitization. No peeling and no blisters of the spun yarn woven fabric were observed in the resulting molded article.

The composition of the carbon fiber spun yarn used is shown in Table 1, and the results of evaluations of the resulting molded article are shown in Table 2.

Example 13

A molded article was obtained in the same manner as in Example 4, except that an adhesive prepared by using 13 parts by mass of a graphite powder ("HAG-15", Nippon Graphite Industry Co., Ltd.) instead of 13 parts by mass of the short carbon fibers ("KRECA CHOP M-107T" produced by KUREHA CORPORATION, average fiber length 0.4 mm, L/D about 28, density 1.63 g/cm³) was used as the adhesive. No peeling and no blisters of the spun yarn woven fabric were observed in the resulting molded article.

The composition of the carbon fiber spun yarn used is shown in Table 1, and the results of evaluations of the resulting molded article are shown in Table 2.

Example 14

A molded article was obtained in the same manner as in Example 2, except that an adhesive prepared by using 13 parts by mass of a graphite powder ("HAG-15", Nippon Graphite Industry Co., Ltd.) instead of 13 parts by mass of the short carbon fibers ("KRECA CHOP M 107T" produced by KUREHA CORPORATION, average fiber length 0.4 mm, L/D about 28, density 1.63 g/cm³) was used as the adhesive. No peeling and no blisters of the spun yarn woven fabric were observed in the resulting molded article.

The composition of the carbon fiber spun yarn used is shown in Table 1, and the results of evaluations of the resulting molded article are shown in Table 2.

Example 15

One hundred parts by mass of each of two types of pitch-based isotropic carbon fiber felts having a bulk density of 0.08 g/cm³ ("KRECA FELT F-105" and "KRECA FELT F-110", KUREHA CORPORATION) were impregnated with 44 parts by mass of a commercially available phenolic resin impregnating solution ("Shonol BRS-3897", SHOWA HIGHPOLYMER CO., LTD.). Then, the felt of one of the types and the felt of the other type were stacked to form a stack. A substrate was prepared using the resulting stack. A molded article was obtained in the same manner as in Example 2, except that this substrate was used. No peeling and no blisters of the spun yarn woven fabric were observed in the resulting molded article.

Comparative Example 1

A molded article was obtained only from the flat plate-shaped carbon fiber stacked body used as the substrate in Example 1 (thickness 10 mm, width 200 mm, length 250 mm, bulk density 0.16 g/cm³). The results of evaluations of the resulting molded article are shown in Table 2.

Comparative Example 2

A molded article was obtained in the same manner as in Example 1, except for adopting the following conditions: A woven fabric (twill weave, FAW 215 g/m², count 19.0 yarns/inch, tensile strength 0.14 kN, thickness 0.38 mm) was formed using spun yarns composed only of pitch-based isotropic carbon fibers ("KRECA SLIVER-SY-652" produced by KUREHA CORPORATION, average fiber diameter 14.5 μm, density 1.63 g/cm³). The woven fabric was cut into two pieces, and one surface of each piece was coated with the adhesive in an amount of 1,000 g/m² by use of a brush. Each adhesive-coated piece was stacked on each surface of the substrate. No peeling and no blisters of the spun yarn woven fabric were observed in the resulting molded article.

The composition of the carbon fiber spun yarn used is shown in Table 1, and the results of evaluations of the resulting molded article are shown in Table 2.

Comparative Example 3

A molded article was obtained in the same manner as in Comparative Example 2, except that two of the spun yarn woven fabrics were stacked on each surface of the flat plate-shaped carbon fiber stacked body in forming the flat plate-shaped molded article, instead of the conditions where the single spun yarn woven fabric was stacked on each surface of the flat plate-shaped carbon fiber stacked body of Comparative Example 2. No peeling and no blisters of the spun yarn woven fabric were observed in the resulting molded article.

The composition of the carbon fiber spun yarn used is shown in Table 1, and the results of evaluations of the resulting molded article are shown in Table 2.

Comparative Example 4

A flat plate-shaped molded article was obtained by performed compression molding and graphitization under the same conditions as in Example 1, except that the following conditions were adopted: 100 parts by mass of a polyacrylonitrile-based (PAN-based) carbon fiber woven fabric ("BESFIGHT Woven Fabric W-3161" produced by TOHO TENAX Co., Ltd.) were impregnated with 40 parts by mass of a phenolic resin. Four of the thus impregnated woven fabrics were readied for use, and two of them were stacked on each surface of the substrate. A powdery phenolic resin ("Cashew No. 05", Cashew Co., Ltd.) and short carbon fibers ("KRECA CHOP M-107T" produced by KUREHA CORPORATION, average fiber length 0.4 mm, L/D about 28, density 1.63 g/cm³) were uniformly mixed and dispersed at 1:1 (mass ratio) to form a mixture, which was interposed as an adhesive between the carbon fiber woven fabrics and between the carbon fiber woven fabric and the carbon fiber stacked body. In the resulting molded article, peeling was observed at the interface between the substrate and the woven fabric layer.

The composition of the carbon fiber spun yarn used is shown in Table 1, and the results of evaluations of the resulting molded article are shown in Table 2.

Comparative Example 5

A flat plate-shaped molded article was obtained in the same manner as in Comparative Example 4, except that the adhesive described in Example 1 was used instead of the mixture of the powdery phenolic resin and the short carbon fibers interposed between the carbon fiber woven fabric and the carbon fiber stacked body of Comparative Example 4. In the resulting molded article, peeling was observed at the interface between the felts of the carbon fiber stacked body.

The composition of the carbon fiber spun yarn used is shown in Table 1, and the results of evaluations of the resulting molded article are shown in Table 2.

TABLE 1

| | Second carbon fibers | | | Third carbon fibers | | | |
| --- | --- | --- | --- | --- | --- | --- | --- |
| | Fiber diameter (μm) | Tensile strength of carbon fibers (MPa) | Proportion (mass %) | Fiber diameter (μm) | Tensile strength of carbon fibers (MPa) | Proportion (mass %) | Spun yarn Fineness (tex) |
| Ex. 1 | 7 | 3920 | 20 | 14.5 | 820 | 80 | 400 |
| Ex. 2 | 7 | 3920 | 50 | 14.5 | 820 | 50 | 400 |
| Ex. 3 | 7 | 3920 | 80 | 14.5 | 820 | 20 | 400 |
| Ex. 4 | 7 | 3920 | 50 | 14.5 | 820 | 50 | 400 |
| Ex. 5 | 7 | 3920 | 50 | 14.5 | 820 | 50 | 400 |
| Ex. 6 | 10 | 1600 | 50 | 14.5 | 820 | 50 | 400 |
| Ex. 7 | 7 | 3920 | 50 | 14.5 | 820 | 50 | 400 |
| Ex. 8 | 7 | 3920 | 50 | 14.5 | 820 | 50 | 400 |
| Ex. 9 | 7 | 3920 | 50 | 14.5 | 820 | 50 | 400 |
| Ex. 10 | 7 | 3920 | 50 | 14.5 | 820 | 50 | 400 |
| Ex. 11 | 7 | 3920 | 50 | 14.5 | 820 | 50 | 400 |
| Ex. 12 | 7 | 3920 | 50 | 14.5 | 820 | 50 | 400 |
| Ex. 13 | 7 | 3920 | 50 | 14.5 | 820 | 50 | 400 |
| Ex. 14 | 7 | 3920 | 50 | 14.5 | 820 | 50 | 400 |
| Ex. 15 | 7 | 3920 | 50 | 14.5 | 820 | 50 | 400 |
| Comp. Ex. 1 | — | — | — | — | — | — | — |
| Comp. Ex. 2 | — | — | — | 14.5 | 820 | 100 | 140 |
| Comp. Ex. 3 | — | — | — | 14.5 | 820 | 100 | 140 |
| Comp. Ex. 4 | 7 | 3920 | 100 | — | — | — | — |
| Comp. Ex. 5 | 7 | 3920 | 100 | — | — | — | — |

TABLE 2

| | Spun yarn woven fabric | | | | Molded article | | | | |
| --- | --- | --- | --- | --- | --- | --- | --- | --- | --- |
| | FAW (g/m²) | Count (yarns/ inch) | Tensile strength (kN) | Weave | Thickness (mm) | Bulk density of carbon fiber stacked body (g/cm³) | No. of spun yarn woven fabrics stacked | Heat-treating conditions | Heat-treating temp. (° C.) | Flexural strength (MPa) |
| Ex. 1 | 580 | 19.0 | 0.32 | Twill weave | 0.88 | 0.16 | 2 | Vacuum | 2000 | 2.0 |
| Ex. 2 | 580 | 19.0 | 0.52 | Twill weave | 0.88 | 0.16 | 2 | Vacuum | 2000 | 3.2 |
| Ex. 3 | 580 | 19.0 | 0.70 | Twill weave | 0.88 | 0.16 | 2 | Vacuum | 2000 | 4.3 |
| Ex. 4 | 580 | 19.0 | 0.52 | Twill weave | 0.88 | 0.16 | 1 | Vacuum | 2000 | 2.3 |

TABLE 2-continued

| | Spun yarn woven fabric | | | | Molded article | | | | |
| --- | --- | --- | --- | --- | --- | --- | --- | --- | --- |
| | FAW (g/m²) | Count (yarns/ inch) | Tensile strength (kN) | Weave | Thick- ness (mm) | Bulk density of carbon fiber stacked body (g/cm³) | No. of spun yarn woven fabrics stacked | Heat- treating condi- tions | Heat- treating temp. (° C.) | Flexural strength (MPa) |
| Ex. 5 | 580 | 19.0 | 0.52 | Twill weave | 0.88 | 0.16 | 1 | Normal pressure | 1200 | 2.6 |
| Ex. 6 | 580 | 19.0 | 0.28 | Twill weave | 0.88 | 0.16 | 2 | Vacuum | 2000 | 1.8 |
| Ex. 7 | 530 | 19.0 | 0.64 | Plain weave | 0.78 | 0.16 | 2 | Vacuum | 2000 | 2.8 |
| Ex. 8 | 310 | 10.0 | 0.26 | Twill weave | 0.62 | 0.16 | 2 | Vacuum | 2000 | 1.9 |
| Ex. 9 | 670 | 22.0 | 0.60 | Twill weave | 1.08 | 0.16 | 2 | Vacuum | 2000 | 3.7 |
| Ex. 10 | 580 | 19.0 | 0.52 | Twill weave | 0.88 | 0.10 | 2 | Vacuum | 2000 | 2.7 |
| Ex. 11 | 580 | 19.0 | 0.52 | Twill weave | 0.88 | 0.30 | 2 | Vacuum | 2000 | 4.1 |
| Ex. 12 | 580 | 19.0 | 0.52 | Twill weave | 0.88 | 0.16 | 2 | Normal pressure | 1200 | 3.8 |
| Ex. 13 | 580 | 19.0 | 0.52 | Twill weave | 0.88 | 0.16 | 1 | Vacuum | 2000 | 3.3 |
| Ex. 14 | 580 | 19.0 | 0.52 | Twill weave | 0.88 | 0.16 | 2 | Vacuum | 2000 | 4.2 |
| Ex. 15 | 580 | 19.0 | 0.52 | Twill weave | 0.88 | 0.16 | 2 | Vacuum | 2000 | 3.2 |
| Comp. Ex. 1 | — | — | — | — | — | 0.16 | — | — | — | 0.6 |
| Comp. Ex. 2 | 215 | 19.0 | 0.14 | Twill weave | 0.38 | 0.16 | 1 | Vacuum | 2000 | 1.0 |
| Comp. Ex. 3 | 215 | 19.0 | 0.14 | Twill weave | 0.38 | 0.16 | 2 | Vacuum | 2000 | 1.4 |
| Comp. Ex. 4 | 200 | 12.3 | — | Twill weave | 0.25 | 0.16 | 2 | Vacuum | 2000 | — |
| Comp. Ex. 5 | 200 | 12.3 | — | Twill weave | 0.25 | 0.16 | 2 | Vacuum | 2000 | — |

The invention claimed is:

1. A carbon fiber-containing stacked molded article, comprising:
   a substrate composed of first carbon fibers piled; and
   a woven fabric layer located on at least one surface of the substrate, and formed by weaving carbon fiber spun yarns including second carbon fibers having an average fiber diameter of 12 μm or less, and third carbon fibers having an average fiber diameter in excess of 12 μm, wherein the carbon fiber spun yarns are selected from spun yarns of a core-sheath structure having the second carbon fibers as a core material and the third carbon fibers as a sheath material; doubled and twisted spun yarns composed of spun yarns of a core-sheath structure having the second carbon fibers as a core material and the third carbon fibers as a sheath material; and combinations thereof wherein the second carbon fibers are anisotropic carbon fibers and the third carbon fibers are isotropic carbon fibers.

2. The carbon fiber-containing stacked molded article according to claim 1, wherein the substrate is a stacked body formed by impregnating a stack of felts, which comprise the first carbon fibers, with a thermosetting resin, or is a carbon fiber stacked body formed by impregnating a stack of felts, which comprise the first carbon fibers, with a thermosetting resin, and then heat-treating the impregnated stacked body of felts.

3. The carbon fiber-containing stacked molded article according to claim 1, wherein tensile strength of a spun yarn woven fabric constituting the woven fabric layer is 0.2 kN or higher.

4. The carbon fiber-containing stacked molded article according to claim 1, which has flexural strength of 1.5 MPa or higher, but lower than 5.0 MPa.

5. A heat insulating material comprising the carbon fiber-containing stacked molded article according to claim 1.

6. The carbon-fiber-containing stacked molded article according to claim 1, wherein the proportions of the second carbon fibers and the third carbon fibers are blended such that the amount of the second carbon fibers is 10% by mass or more and 90% by mass or less.

7. A carbon fiber-containing stacked molded article, comprising:
   a stacked body formed by impregnating a stack of felts, which comprise first carbon fibers, with a thermosetting resin, or a carbon fiber stacked body formed by impregnating a stack of felts, which comprise the first carbon fibers, with a thermosetting resin, and then heat-treating the impregnated stack of felts; and
   a woven fabric layer located on at least one surface of the carbon fiber stacked body, and formed by weaving spun yarns selected from spun yarns of a core-sheath structure having second carbon fibers having an average fiber diameter of 12 μm or less as a core material, and third carbon fibers having an average fiber diameter in excess of 12 μm as a sheath material; doubled and twisted spun yarns composed of spun yarns of a core-sheath structure having the second carbon fibers as a core material and the third carbon fibers as a sheath material; and combinations thereof.

8. The carbon fiber-containing stacked molded article according to claim 7, wherein the second carbon fibers are anisotropic carbon fibers, and the third carbon fibers are isotropic carbon fibers.

9. The carbon fiber-containing stacked molded article according to claim 7, wherein tensile strength of a spun yarn woven fabric constituting the woven fabric layer is 0.2 kN or higher.

10. The carbon fiber-containing stacked molded article according to claim 7, which has flexural strength of 1.5 MPa or higher, but lower than 5.0 MPa.

11. A heat insulating material comprising the carbon fiber-containing stacked molded article according to claim 7.

12. The carbon fiber-containing stacked molded article according to claim 7, wherein the proportions of the second carbon fibers and the third carbon fibers are blended such that the amount of the second carbon fibers is 10% by mass or more and 90% by mass or less.

13. A method for producing a carbon fiber-containing stacked molded article, comprising:
 a substrate preparation step of piling first carbon fibers to prepare a substrate;
 a woven fabric formation step of spinning second carbon fibers having an average fiber diameter of 12 μm or less, and third carbon fibers having an average fiber diameter in excess of 12 μm to prepare a carbon fiber spun yarn, and forming a woven fabric from the resulting carbon fiber spun yarn, wherein the carbon fiber spun yarns are selected from spun yarns of a core-sheath structure having the second carbon fibers as a core material and the third carbon fibers as a sheath material; doubled and twisted spun gars composed of spun yarns of a core-sheath structure having the second carbon fibers as a core material and the third carbon fibers as a sheath material; and combinations thereof;
 an adhesion step of stacking at least the woven fabric to at least one surface of the substrate by use of an adhesive to form a carbon fiber-containing stacked body having the substrate and a woven fabric layer; and
 a heat-treating step of compression molding the carbon fiber-containing stacked body, and then heat-treating the compression molded carbon fiber-containing stacked body.

14. The method according to claim 13, wherein the substrate preparation step comprises impregnating a stack of felts composed of the first carbon fibers with a thermosetting resin to form a stacked body.

15. The method according to claim 13, wherein the substrate preparation step comprises impregnating a stack of felts composed of the first carbon fibers with a thermosetting resin, and then heat-treating the impregnated stacked body of felts.

16. The method according to claim 13, wherein the second carbon fibers are anisotropic carbon fibers, and the third carbon fibers are isotropic carbon fibers.

17. The method according to claim 13, wherein the proportions of the second carbon fibers and the third carbon fibers are blended such that the amount of the second carbon fibers is 10% by mass or more and 90% by mass or less.

* * * * *